(12) United States Patent
Froissart et al.

(10) Patent No.: US 8,684,671 B2
(45) Date of Patent: Apr. 1, 2014

(54) TURBOMACHINE CASING

(75) Inventors: Bruno Froissart, Vert Saint Denis (FR); François Maurice Garcin, Paris (FR); Delphine Hermance Maxime Parent, Montrouge (FR); Vincent Roy, Melun (FR)

(73) Assignee: SNECMA, Paris (FR)

( * ) Notice: Subject to any disclaimer, the term of this patent is extended or adjusted under 35 U.S.C. 154(b) by 498 days.

(21) Appl. No.: 13/096,294

(22) Filed: Apr. 28, 2011

(65) Prior Publication Data

US 2011/0274540 A1 Nov. 10, 2011

(30) Foreign Application Priority Data

Apr. 29, 2010 (FR) ...................................... 10 53339

(51) Int. Cl.
*F01D 25/04* (2006.01)
(52) U.S. Cl.
USPC .......................................... 415/119; 415/220
(58) Field of Classification Search
USPC ................................................. 415/119, 220
See application file for complete search history.

(56) References Cited

U.S. PATENT DOCUMENTS

| | | | | |
|---|---|---|---|---|
| 1,502,903 | A | * | 7/1924 | Campbell ........................ 416/61 |
| 3,319,929 | A | | 5/1967 | Lawrence et al. |
| 3,589,475 | A | * | 6/1971 | Alford ............................. 188/381 |
| 4,728,255 | A | * | 3/1988 | Kirkpatrick et al. ............ 415/119 |

FOREIGN PATENT DOCUMENTS

| | | |
|---|---|---|
| EP | 1 016 792 A2 | 7/2000 |
| EP | 2 112 326 A1 | 10/2009 |
| FR | 2 931 191 | 11/2009 |
| WO | WO 2005/012696 A1 | 2/2005 |

OTHER PUBLICATIONS

French Preliminary Search Report issued Dec. 6, 2010 in French 10 53339, filed Apr. 29, 2010 (with English Translation of Category of Cited Documents).

* cited by examiner

*Primary Examiner* — Ninh H Nguyen
(74) *Attorney, Agent, or Firm* — Oblon, Spivak, McClelland, Maier & Neustadt, L.L.P.

(57) ABSTRACT

A turbomachine casing forming a continuous annular ring extending over 360° around a bladed wheel and serving as a propagation medium for rotating waves, each rotating wave being generated by two standing waves of the same frequency, and the casing including at least one longitudinal stiffener at its outer periphery that is dimensioned and positioned in such a manner as to separate the frequencies of the two standing waves of at least one given rotating wave.

8 Claims, 3 Drawing Sheets

TURBOMACHINE CASING

FIELD OF THE INVENTION

The present invention relates to a turbomachine casing and to a turbomachine fitted with such a casing, such as for example an airplane turboprop or turbojet.

Conventionally, a turbomachine comprises a plurality of casings surrounding stationary vanes and bladed wheels. In order to limit aerodynamic losses, it is desirable to reduce the clearance between the tips of the blades and the casings surrounding them. Nevertheless, reducing this clearance can encourage contacts to occur between the blades of the wheels and the casing.

In particular, structures having cyclical symmetry, such as bladed wheels and casings, encourage the appearance of rotating resonant modes (also known as rotating waves) on both of the structures between which contacts can occur as a result of a so-called "modal" interaction phenomenon.

A rotating wave of the casing interacts with a rotating wave of a bladed wheel if all of the following conditions apply: the casing and the bladed wheel are capable of vibrating in a mode having the same number of diameters; each structure vibrates at the resonant frequency of the mode at the number of diameters under consideration; and finally the propagation speeds of the rotating waves coincide.

Unfortunately, in the range of operating speeds of a turbomachine, these conditions can be satisfied for a plurality of rotating resonant modes, i.e. for a plurality of diameter number modes, and this is not acceptable if the physical integrity of the casing and of the bladed wheels is to be guaranteed and if it is desired to avoid reducing the performance of the turbomachine.

BACKGROUND OF THE INVENTION

Thus, in the prior art, it is known to stiffen the casing by circumferential stiffeners in order to increase the propagation speed of rotating waves in the casing. Thus, for each number of diameters, the propagation speed of a rotating wave in the casing and the propagation speed of a rotating wave of a bladed wheel become equal only outside the operating range of the turbomachine.

Nevertheless, stiffening the casing can be insufficient or it can lead to adding thicknesses of material on the casing that are unacceptable in terms of the weight requirements that are to be satisfied.

OBJECT AND SUMMARY OF THE INVENTION

A particular object of the invention is to provide a solution to that problem that is simple, effective, and inexpensive, while avoiding the above-mentioned drawbacks.

To this end, the invention provides a turbomachine casing forming a continuous annular ring extending over 360° around a bladed wheel and serving as a propagation medium for rotating waves, each rotating wave being generated by two standing waves having the same frequency, wherein the casing includes at least one longitudinal stiffener at its outer periphery positioned at an antinode of at least one of the two standing waves of a given rotating wave in order to separate the frequencies of the two standing waves.

By incorporating one or more stiffeners of determined dimensions at determined locations on the casing in a non-symmetrical manner around the axis of the casing, it is possible to obtain a frequency offset between the two standing waves, thereby avoiding or at least very greatly limiting constructive interaction between them that would give rise to a traveling wave.

Separating the frequencies of the double modes having two standing waves, serves to avoid the formation of a rotating wave in the casing that is synchronous with the rotary excitation provided by the blades of the wheel surrounded by the casing.

Incorporating a longitudinal stiffener also makes it possible to change the shape of one of the two standing waves of at least one rotating resonant mode.

Instead of acting on the propagation speed of the rotating wave of the casing, the invention prevents the rotating wave from being formed, which means that there is no need to stiffen the casing by adding significant extra thicknesses of material over its entire circumference.

The positioning of the stiffener at an antinode of at least one standing wave of a given rotating wave serves to limit interaction as much as possible between two standing waves of a given rotating resonant mode.

Preferably, the stiffener is dimensioned and positioned in such a manner that the frequency difference between the standing waves of a given rotating wave is greater than or equal to 3%. This value of 3% corresponds to the desirable minimum frequency difference that makes it possible significantly to limit interaction between two standing waves of a given mode. Thus, with a casing of the invention, it is possible to reduce the amplitude of the rotating wave by a factor lying in the range 3 to 50 compared with a casing that does not have a longitudinal stiffener.

In a particular embodiment of the invention, the casing has at least two stiffeners arranged at 90° or 180° from each other.

The casing of the invention may include a plurality of longitudinal stiffeners positioned around the axis of the casing at mutually differing angular intervals.

The above-mentioned stiffeners(s) is/are advantageously positioned and dimensioned to generate frequency differences between the stationary waves of a given plurality of rotating waves.

BRIEF DESCRIPTION OF THE DRAWINGS

The invention can be better understood and other details, advantages, and characteristics of the invention appear on reading the following description made by way of non-limiting example and with reference to the accompanying drawings, in which.

MORE DETAILED DESCRIPTION

Figure 1:
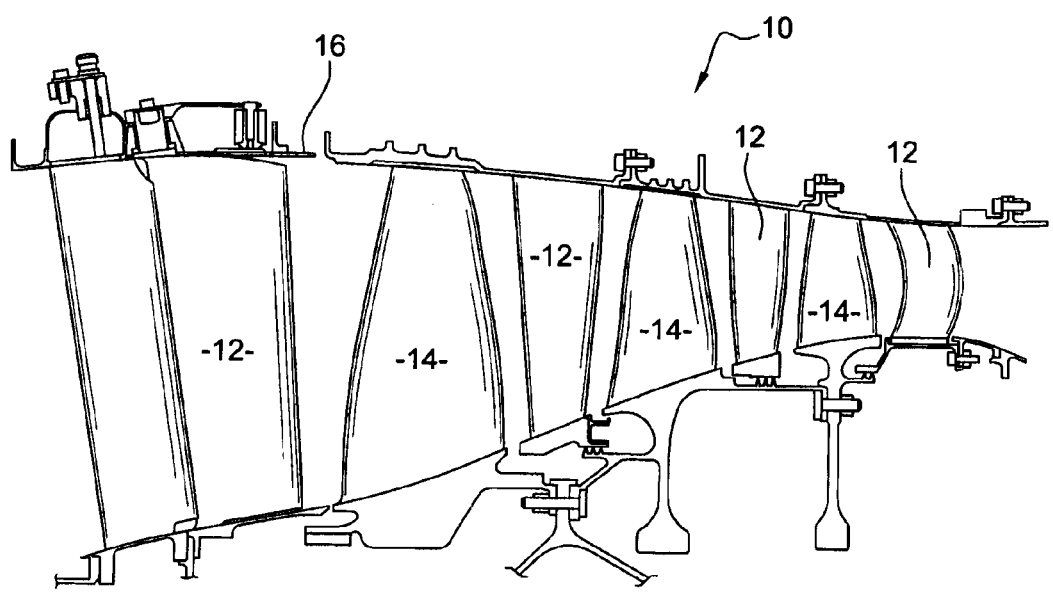
FIG. 1 is a fragmentary diagrammatic view in axial section of a high pressure compressor in a turbomachine of the prior art.

Reference is made initially to FIG. 1, which shows a high pressure compressor 10 of a turbomachine arranged immediately upstream from a combustion chamber and comprising a plurality of rows of guide vanes 12 arranged in alternation with rows of moving blades 14 and surrounded on the outside by a casing 16. The bladed wheels 14 are driven in rotation by the rotor of a high pressure turbine that is located at the outlet from the combustion chamber.

Figure 2:
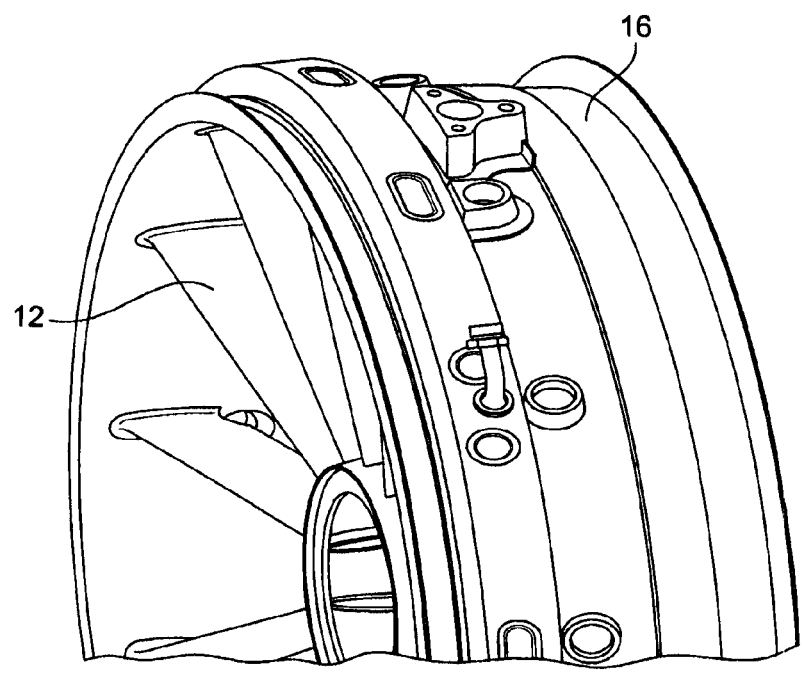
FIG. 2 is a diagrammatic perspective view of a casing of the prior art.

FIG. 2 shows the casing 16 of the high pressure compressor of FIG. 1. The casing is generally made up of a plurality of sectors that are arranged end to end and fastened together. The casing 16 thus forms a continuous annular ring extending over 360°. Because of the way it is designed in the form of sectors, such a casing presents cyclical symmetrical about its axis.

In operation, rotating waves may be formed at different numbers of diameters on the casing and on the bladed wheels. The diameter number corresponds to the number of antinodes (or of nodes) present on a half-circumference of the casing.

Interaction may become established between a rotating wave of the casing and a rotating wave of a bladed wheel when:
  the casing and the bladed wheel are vibrating in a mode having the same number of diameters;
  the casing and the bladed wheel are vibrating at the resonant frequency of the mode at the number of diameters under consideration; or
  the propagation speeds of the rotating waves coincide.

These conditions for interaction may occur at a plurality of modes with different numbers of diameters and may give rise to energy exchange by contact between the casing and a bladed wheel, thereby reducing the performance of the turbomachine.

Figure 3:
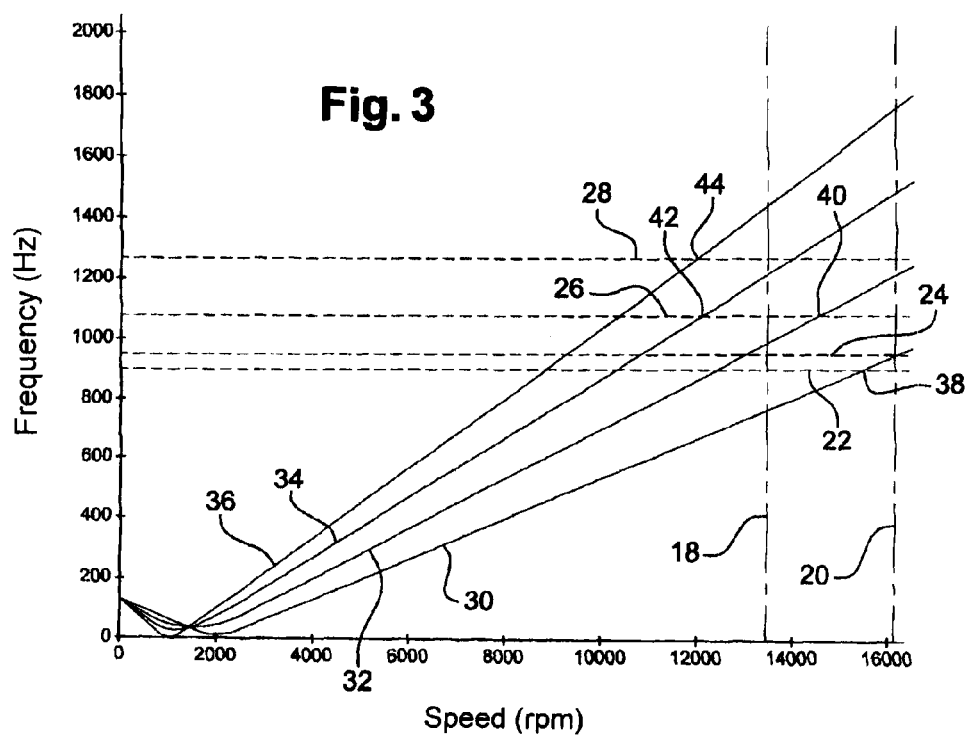
FIG. 3 is a graph showing the variation in the resonant frequencies of several modes at given numbers of diameters.

These interactions are visible in FIG. 3 which plots variations in the resonant frequencies of modes at 5, 6, 7, and 8 diameters as a function of the speed of rotation of the rotor. The vertical line 18 situated between 13,000 revolutions per minute (rpm) and 14,000 rpm represents the maximum speed of rotation of the rotor of the high pressure compressor and the vertical line 20 represents 120% of the maximum speed of rotation.

The resonant frequency of the casing 16 for a given number of diameters does not depend on the speed of operation of the turbomachine, i.e. on the speed of rotation of the rotor of the high pressure compressor. The horizontal lines 22, 24, 26, and 28 represent the resonant frequencies of the casing for modes at 5, 6, 7, and 8 diameters respectively.

The resonant frequency of a mode at a given number of diameters for a bladed wheel varies as a function of the speed of rotation of the rotor of the high pressure compressor, and the curves 30, 32, 34, and 36 show how the resonant frequency of a bladed wheel varies for the modes at 5, 6, 7, and 8 diameters respectively.

For each rotating wave at some number of diameters, there is a critical value for the speed of rotation of the rotor at which the rotating wave of the casing interacts with the rotating wave of the bladed wheel. This interaction is visible on the graph of FIG. 3 by the intersections 38, 40, 42, and 44 between the curves 30, 32, 34, and 36 with the horizontal lines 22, 24, 26, and 28 respectively.

It can thus be seen that there are three interactions that are present in the operating range of the turbomachine for the modes at 6, 7, and 8 diameters, and one interaction in the range 100% to 120% of the maximum speed of rotation.

It is thus possible in normal operation for a rotating wave of the casing to interact with a rotating wave of a bladed wheel, and it is absolutely essential for that to be avoided. Furthermore, in order to guarantee some minimum safety margin, turbomachine manufacturers also avoid any interaction potentially occurring in the operating range 100% and 120% of the speed of rotation of the rotor of the high pressure compressor.

In order to avoid these interactions between rotating waves of the casing and rotating waves of a bladed wheel, it is known to stiffen the casing, thereby increasing the propagation speed of the rotating waves and their associated resonant frequencies. In this way, the interaction between a rotating wave of the casing and a rotating wave of a bladed wheel at a given number of diameters occurs at a critical speed of rotation of the rotor of the high pressure compressor that is higher and outside the operating range of the turbomachine.

The casing is made stiffer by adding extra thicknesses that extend circumferentially over the outer periphery of the casing, thereby giving rise to a significant increase in the weight of the casing.

The invention enables that drawback to be remedied by acting directly on the formation of rotating waves.

Figure 4:
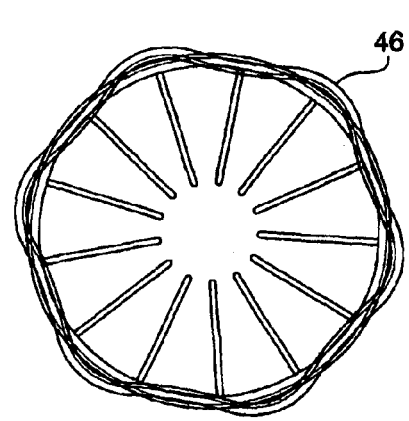
FIGS. 4 and 5 show the waves of two standing waves at six diameters and at the same frequency on a prior art casing.
Figure 5:
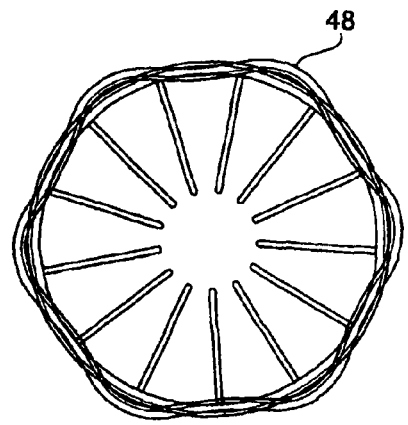

A rotating wave at a given number of diameters propagating on the casing is generated by two standing waves 46 and 48 at the same frequency and at a phase offset of one-quarter of the wavelength (FIGS. 4 and 5 for a mode at six diameters). The interaction between the two standing waves 46 and 48 leads to a rotating (or traveling) wave being formed at a frequency equal to the frequency of the standing waves.

Figure 6:
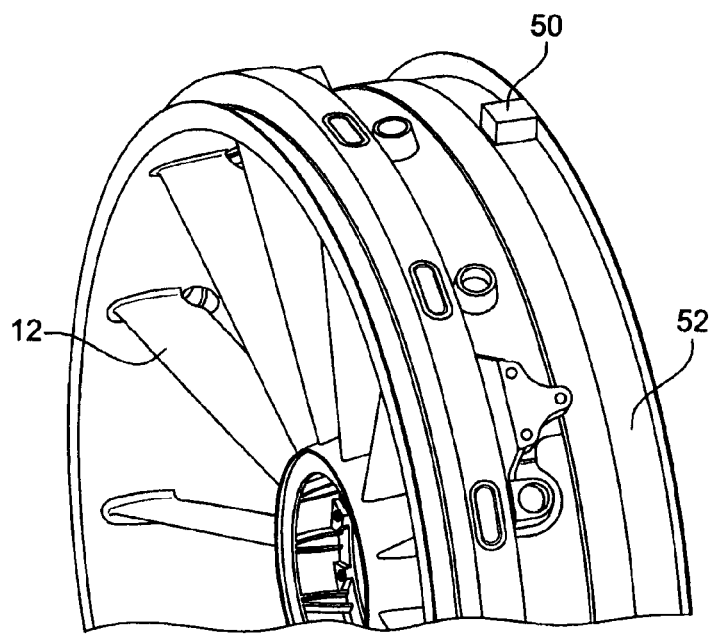
FIG. 6 is a diagrammatic perspective view of a casing of the invention.

Incorporating at least one longitudinal stiffener 50 on the outer periphery of the casing 52 serves to achieve a frequency offset between the two standing waves of at least one mode at a given number of diameters (FIG. 6). In this way, the interaction between the two standing waves can no longer give rise to a rotating (or traveling) wave propagating around the casing.

A sufficient frequency offset is achieved by appropriately positioning and dimensioning the longitudinal stiffener on the casing.

Figure 7:
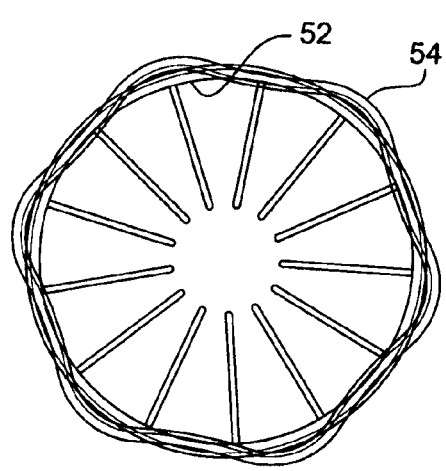
FIGS. 7 and 8 show the waves of two standing waves at six diameters on a casing of the invention.
Figure 8:
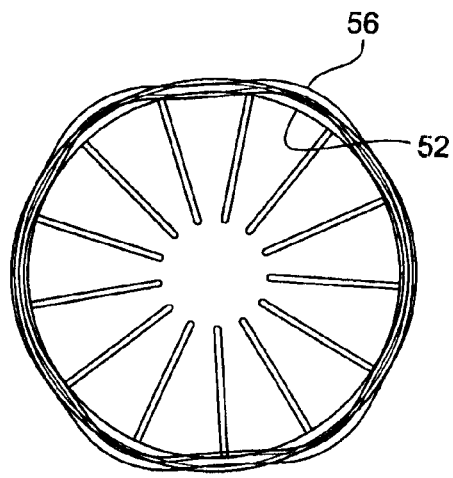

FIGS. 7 and 8 show a casing of the invention with two standing waves for a mode at six diameters. FIG. 7 shows the casing 52 having a standing wave 54 superposed thereon and FIG. 8 shows the same casing 52 having a standing wave 56 superposed thereon that is angularly offset by one-quarter of the wavelength. Incorporating longitudinal stiffeners 50 makes it possible to have a first standing wave 54 at a frequency of 978.4 hertz (Hz) and a second standing wave 56 at a frequency of 1020.7 Hz, thereby giving a frequency difference of about 4.3%. It is also found that incorporating stiffeners serves to diminish the amplitude of the vibrations of the standing wave 48 (FIG. 8) relative to the same standing wave on a casing without stiffeners (FIG. 5). This result is obtained with four longitudinal stiffeners that are circumferentially spaced apart from one another with an inter-stiffener angular pitch of 90°. Each stiffener has a circumferential and radial dimension of about 20 millimeters (mm) and a longitudinal dimension of 40 mm.

It is possible to incorporate a plurality of longitudinal stiffeners that are distributed around the axis at different intervals from one another so as to optimize the frequency offset for each mode at some number of diameters.

Advantageously, the stiffener(s) is/are positioned on an antinode of at least one standing wave of each of the rotating waves under consideration.

Preferably, the frequency difference between the two standing waves at the same diameter number mode is greater than or equal to 3%, so as to guarantee that no interaction can become established between the two standing waves.

The stiffeners 50 may be ribs as in FIG. 6. These ribs may extend over part or all of the axial length of the casing.

Incorporating stiffeners as described above makes it possible to reduce the weight of the casing by about 10% compared with a casing having circumferential stiffeners added thereto, as in the prior art.

What is claimed is:

1. A turbomachine casing forming a continuous annular ring extending over 360° around a bladed wheel and serving as a propagation medium for rotating waves, each rotating wave being generated by two standing waves having the same frequency, wherein the casing includes at least one longitudinal stiffener at its outer periphery positioned at an antinode of at least one of the two standing waves of a given rotating wave in order to separate the frequencies of the two standing waves.

2. A casing according to claim 1, wherein the frequency difference between the standing waves of the rotating wave is greater than or equal to 3%.

3. A casing according to claim 1, including at least two stiffeners arranged at 90° or 180° relative to each other.

4. A casing according to claim 1, including a plurality of the above-mentioned stiffeners that are positioned around the axis at mutually differing angular intervals.

5. A casing according to claim 1, wherein the or each above-mentioned stiffener is/are positioned and dimensioned so as to generate frequency differences between the standing waves of a plurality of given rotating waves.

6. A casing according to claim 5, wherein the stiffeners are axial ribs.

7. A casing according to claim 6, wherein the ribs extend over at least a portion of the axial length of the casing.

8. A turbomachine includes a casing according to claim 1.

* * * * *